United States Patent Office 3,167,581
Patented Jan. 26, 1965

3,167,581
PROCESS FOR THE PREPARATION OF N-METHYL-
ENE GLYCINONITRILE
Kenneth Worden Saunders, Darien, William Herbert
Montgomery, Springdale, and James Charles French,
Stamford, Conn., assignors to American Cyanamid
Company, Stamford, Conn., a corporation of Maine
No Drawing. Filed Apr. 12, 1962, Ser. No. 186,860
3 Claims. (Cl. 260—465.5)

This invention relates to the synthesis of nitriles. More particularly, it relates to a novel process for preparing N-methylene glycinonitrile.

N-methylene glycinonitrile has previously been prepared by several different routes. A classical procedure for its preparation is that described by Klages in J. prakt. Chem. (2), 65, 192 (1902). This particular preparative method is not especially attractive commercially because it involves the use of an expensive intermediate, glycinonitrile hydrochloride.

N-methylene glycinonitrile has also been prepared by the reaction of formaldehyde, an ammonium halide and an alkali metal cyanide in the presence of acid as described by Jay and Curtius, Ber. 27, 59 (1894) and, later, by Adams and Langley, Organic Synthesis, Coll. Vol. I, 347 (1932). Recently, an improvement upon this basic process was described by Sexton and Britton, U.S. Patent No. 2,823,222. However, the latter process is batch or only semi-continuous and extensive cooling of the reaction mixture to low temperature is also necessary.

It has thus long been desirable to find a continuous and simplified method for the preparation of N-methylene glycinonitrile and to avoid, if at all possible, the use of intermediates. The present invention accomplishes all of these objectives in a very straight-forward manner.

It has now been discovered that N-methylene glycinonitrile may be prepared in a direct one-step synthesis from cheap, widely available starting materials which synthesis not only avoids the use of intermediates found necessary for prior art processes but also eliminates costly processing steps.

In accordance with the present invention, therefore, it has been found that N-methylene glycinonitrile may be obtained from hydrogen cyanide, formaldehyde and ammonia by critically controlling the mixing of the reactants, the mol ratio of each of these reactants, the temperature and pH of the reaction, and the residence time of the reactants within a reaction chamber. Essentially, our invention may be said to be based upon the principle that hydrogen cyanide, formaldehyde and ammonia may be reacted in a continuous process under certain critically controlled conditions to obtain N-methylene glycinonitrile. While continuity of operation in any chemical process is always an objective, it is an achievement which is not easily realized. It is primarily for this reason that the process of the present invention constitutes such a radical departure from the prior art procedures for the preparation of N-methylene glycinonitrile.

According to the present invention, the mol ratio of formaldehyde to hydrogen cyanide and the mol ratio of ammonia to hydrogen cyanide, the temperature and pH of the reaction mixture are maintained at critical levels and the feed of all three reactants to a reactor is critically controlled so as to obtain N-methylene glycinonitrile in extremely high yields in a continuous manner. In carrying out this substantially continuous process, an acid-stabilized aqueous formaldehyde solution is first circulated through the reactor and the system is then brought to operating pressure. To this solution hydrogen cyanide is added and mixed therewith while the pH is maintained below about 4. Ammonia is then added to the formaldehyde-hydrogen cyanide solution and the system is brought to operating temperature. When equilibrium conditions are obtained, which is rapid because of the exothermic nature of the reaction, the feed of all three reactants to the reactor is continued at approximately the same rate, i.e., the mol ratio of the reactants is unchanged. The pH of the solution of reactants within the reactor is maintained at least above 7. During the feed of the reactants to the reactor, product solution is withdrawn continuously from the reactor at a rate so as to permit optimum and critical residence time of the reactants within the reactor. After cooling and acidification of the product solution to a pH between two and seven, N-methylene glycinonitrile is precipitated. The product is then isolated and recovered from the reaction mass by filtration, decantation or the like. It has thus been found that conversions of formaldehyde to N-methylene glycinonitrile of 35 to 50% and of hydrogen cyanide to N-methylene glycinonitrile of 35 to 55% are readily realizable by this process.

In the process of this invention, the mol ratio of formaldehyde to hydrogen cyanide is maintained at between about 1.0 and 4.0, and preferably between about 1.6 and 3.0, while the mol ratio of ammonia to hydrogen cyanide is maintained between about 1.0 and 4.0, and preferably between about 3.5 and 4.0.

The temperature of the reaction mixture is maintained within the range of from about 40 to 110° C., and preferably between about 60 and 100° C. It has been found that residence times of the reactants within the reactor of less than about ten minutes are advantageously employed with times of two to six minutes preferred.

The reaction which takes place in the practice of the process of the present invention may be illustrated by the following equation:

$$2CH_2O + HCN + NH_3 \rightarrow CH_2{=}N{-}CH_2CN + 2H_2O$$

While the overall process is not limited to the use of a particular type of reaction chamber in which the direct one-step continuous synthesis of N-methylene glycinonitrile is carried out, it is advantageous to describe equipment of the type which may be used.

The reaction of formaldehyde, hydrogen cyanide and ammonia was carried out in a three-stage continuous tubular reactor designed for a fast exothermic reaction. Each reactor stage consisted of a hair-pin loop of ¼" stainless steel. Thermocouples were placed at the entrance and in the middle of the reactor. The reactor was surrounded by a jacket to which water from a steam-water mixer was fed continuously countercurrently. The volume of the first, second and third stages was 238, 119.5 and 119.5 milliliters, respectively. The valving on this equipment was such that nine different flow patterns were permissible. Although this set up was called a three-stage reactor and could be used as such, the kinetics of the reaction were studied in a single stage reactor wherein the flow was circulated through the reactor while the volume was 238 milliliters. Alternatively, however, the flow could be circulated through the first and second loops where the volume was 357.5 milliliters or through all three loops where the volume was 477 milliliters. The design of the reactors limited temperatures to 110° C. and pressures to 150 pounds per square inch.

The reactants were pumped and mixed just prior to entry into the first loop of the continuous single-step reactor.

The formaldehyde was fed as an acid-stabilized aqueous solution. Liquid hydrogen cyanide was pumped against a discharge pressure of 175 p.s.i. and the discharge system contained appropriate relief valves to reduce the possibility of back up of the reactor product into the hydrogen cyanide feed system. Anhydrous ammonia was fed as a liquid from an ammonia storage tank pressurized with nitrogen at 200 p.s.i.

Hydrogen cyanide and acid stabilized formaldehyde were first mixed in a tee and immediately following this was a thermocouple inserted to record any temperature rise. In the process of this invention, an exotherm upon mixing was not observed at this point thus indicating the absence of any reaction between hydrogen cyanide and formaldehyde on the acid side which reaction would have given rise to the possibility that glycolonitrile was produced in situ. Next in line was a pipe cross, two ports of which served as part of the reaction loop described previously. The formaldehyde-hydrogen cyanide feed entered the third port and ammonia entered the fourth port of the pipe cross.

The formaldehyde employed in the process is ordinarily in aqueous solution advantageously stabilized with methanol in an amount from about 8 to 12%. Commercially available solutions containing 30 to 40% formaldehyde are preferably employed. Solutions containing formaldehyde in higher concentrations may also be used with good success, however. Additionally, it is essential to employ formaldehyde which is acid stabilized. Acids suitable for stabilization include the mineral acids and, of these phosphoric acid is preferred. In order to stabilize the formaldehyde and to maintain the pH of the combined formaldehyde-hydrogen cyanide stream at below about 4 until it is admixed with ammonia, the amount of acid generally ranges from about 0.05 to about 0.5%.

In addition to N-methyleneglycinonitrile glycinonitrile and iminodiacetonitrile may also be obtained. Quantitative analysis was employed for determining the amount of N-methylene glycinonitrile, glycinonitrile and ammonia. The reaction product solution was titrated nonaqueously in 1:6-acetonitrile:nitromehane with perchloric acid dissolved in nitromethane. Three breaks in the titration curve indicated, in order, ammonia, glycinonitrile and N-methylene glycinonitrile. Iminodiacetonitrile was then calculated from material balances.

N-methylene glycinonitrile is separated by acidification, e.g., with hydrochloric acid, of the reaction mixture to approximately pH 2.5 to 3.0. The solid is filtered, washed with water and recrystallized from hot water. N-methylene glycinonitrile so obtained melted at 128 to 130° C. (Literature 129° C.).

Analysis, percent.—Theory: C, 52.93; H, 5.92; N, 41.15. Found: C, 52.68; H, 6.22; N, 41.19.

When iminodiacetonitrile is produced it is isolated, prior to the recovery of N-methylene glycinonitrile, by cooling the reaction product whereupon the iminodiacetonitrile precipitated out and it is separated by filtration. The product is recrystallized from hot benzene and a sample melted at 74 to 78° C. (Literature 75 to 77° C.)

Analysis, percent.—Theory: C, 50.6; H, 5.26; N, 44.2. Found: C, 49.52; H, 6.63; N, 43.92.

In order to illustrate the manner in which the present invention may be carried out, the following table summarizes the results of various runs, which are not to be considered as limitative examples:

Table

| Run | T., °C. | Residence Time (min.) | CH$_2$O in Feed (mol/l.) | Mol Ratios | | Conversions (Percent) | | | | | |
| | | | | CH$_2$O/HCN | NH$_3$/HCN | CH$_2$O to— | | | HCN to— | | |
| | | | | | | MGN[1] | GN[2] | IN[3] | MGN | GN | IN |
|---|---|---|---|---|---|---|---|---|---|---|---|
| 3A | 57 | 2.4 | 3.31 | 1.75 | 2.1 | 33.2 | 38.1 | 26 | 37.4 | 21.8 | 26 |
| 3B | 57 | 3.6 | 3.31 | 1.75 | 2.1 | 40.5 | 40.5 | 17 | 46.7 | 23.3 | 10 |
| 3C | 57 | 4.8 | 3.31 | 1.75 | 2.1 | 34.4 | 42.2 | 21 | 39.1 | 24.0 | 12 |
| 3E | 100 | 3.6 | 3.33 | 1.8 | 2.1 | 40.8 | 45.8 | 12 | 46.1 | 26.1 | 4 |
| 12B | 57 | 3.6 | 6.05 | 1.8 | 2.1 | 48.1 | 37.3 | 12 | 53.6 | 20.8 | 7 |
| 12E | 100 | 3.6 | 6.05 | 1.8 | 2.1 | 49.1 | 54.9 | 0 | 53.3 | 30.8 | 0 |
| 12S | 100 | 2.4 | 5.35 | 3.0 | 1.3 | >80 | | 0 | >80 | | 0 |

[1] N-methylene glycinonitrile. [2] Glycinonitrile. [3] Iminodiacetonitrile.

From the above data, it will be seen that high conversion to N-methylene glycinonitrile is obtained when HCN=1.78, CH$_2$O=5.35, NH$_3$=6.77 mols/liter and at a high temperature and low volume. At less than optimum conditions, larger quantities of glycinonitrile and iminodiacetonitrile are also produced.

While the process of the present invention is well adapted to operation in a continuous manner employing a tubular converter under conditions of either viscous or turbulent flow, the reaction may also be conducted in a stirred autoclave or other similar type apparatus.

While the present invention has been described in conjunction with various preferred embodiments, it is to be understood that the invention is not to be limited to such exemplary description and is to be construed broadly and limited only by the following claims.

We claim:
1. A continuous process for preparing N-methylene glycinonitrile which comprises bringing into reactive contact for a period of less than about ten minutes acid stabilized formaldehyde, hydrogen cyanide and ammonia and maintaining during said contact period
   (a) the mol ratio of CH$_2$O/HCN at between about 1.6/1 and 3/1;
   (b) the mol ratio of NH$_3$/HCN at between about 1/1 and about 4/1;
   (c) the temperature at between about 40 and about 100° C.
   (d) the pH at greater than 7
and subsequently isolating N-methylene glycinonitrile from the reaction mixture.

2. A process as in claim 1 in which reactive contact is established by adding ammonia to an aqueous solution of acid stabilized formaldehyde and hydrogen cyanide.

3. A process as in claim 2 in which said aqueous solution of formaldehyde and hydrogen cyanide is maintained at a pH of less than about 4.

References Cited in the file of this patent

UNITED STATES PATENTS

| 2,405,966 | Loder | Aug. 20, 1946 |
| 2,511,487 | Thompson | June 13, 1950 |